(12) United States Patent
Ni

(10) Patent No.: US 8,944,793 B2
(45) Date of Patent: Feb. 3, 2015

(54) FLOW AND PRESSURE RIPPLE REDUCTION WITH ADVANCE DUAL GEAR AND BEARING FACE CUT

(75) Inventor: Weishun Ni, Rockton, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 225 days.

(21) Appl. No.: 13/614,173

(22) Filed: Sep. 13, 2012

(65) Prior Publication Data

US 2013/0319153 A1    Dec. 5, 2013

Related U.S. Application Data

(60) Provisional application No. 61/655,770, filed on Jun. 5, 2012.

(51) Int. Cl.
| | | |
|---|---|---|
| F03C 2/00 | (2006.01) | |
| F03C 4/00 | (2006.01) | |
| F04C 18/00 | (2006.01) | |
| F16H 1/06 | (2006.01) | |
| F04C 2/18 | (2006.01) | |
| F04C 11/00 | (2006.01) | |

(52) U.S. Cl.
CPC .. F16H 1/06 (2013.01); F04C 2/18 (2013.01); *F04C 11/001* (2013.01); *F04C 2210/1044* (2013.01); *F04C 2220/24* (2013.01); *F04C 2240/56* (2013.01)
USPC ...... 418/206.5; 418/9; 418/206.1; 418/206.7; 74/421 R

(58) Field of Classification Search
CPC ............ F04C 2/084; F04C 2/086; F04C 2/14; F04C 2/18; F04C 18/084; F04C 18/126; F04C 18/18; F04C 2250/20; F01C 1/084; F01C 1/14; F01C 1/18; F01C 1/20; F01C 17/02; F16H 1/20; F16H 55/08; F16H 55/17
USPC ................... 418/5, 9, 203, 205, 206.1–206.9; 74/421 R, 457
See application file for complete search history.

(56) References Cited

U.S. PATENT DOCUMENTS

| | | | | |
|---|---|---|---|---|
| 1,734,779 | A | * | 11/1929 | Randolph ........................ 418/9 |
| 3,180,559 | A | * | 4/1965 | Boyd ............................ 418/194 |
| 3,481,532 | A | * | 12/1969 | Fraser ............................... 418/9 |
| 4,729,727 | A |   | 3/1988 | Aarestad |
| 5,108,275 | A | * | 4/1992 | Sager ......................... 418/206.5 |
| 2010/0104463 | A1 | * | 4/2010 | Morselli .................... 418/206.1 |
| 2010/0158739 | A1 | * | 6/2010 | Ni et al. ..................... 418/206.5 |
| 2010/0266437 | A1 |   | 10/2010 | Martin-Dye |
| 2012/0219449 | A1 |   | 8/2012 | Ni et al. |

* cited by examiner

Primary Examiner — Theresa Trieu
(74) Attorney, Agent, or Firm — Cantor Colburn LLP

(57) ABSTRACT

An aircraft turbine engine Fuel Metering Unit (FMU) is provided including a main gear pump having a main drive gear and a main driven gear and a servo gear pump having a servo drive gear and a servo driven gear. The main drive gear and the servo drive gear are received on an input shaft. The main driven gear is mounted to a first shaft oriented parallel to and adjacent a first side of the input shaft. The main driven gear is in meshing engagement with the main drive gear. The servo drive gear is mounted to a second shaft arranged parallel to and adjacent a second, opposite side of the input shaft. The servo driven gear is in meshing engagement with the servo drive gear.

20 Claims, 11 Drawing Sheets

FLOW AND PRESSURE RIPPLE REDUCTION WITH ADVANCE DUAL GEAR AND BEARING FACE CUT

CROSS REFERENCE TO RELATED APPLICATIONS

This application claims the benefit of the following U.S. Provisional Patent Application Ser. No. 61/655,770 filed on Jun. 5, 2012, the content of which is incorporated herein by reference thereto.

BACKGROUND OF THE INVENTION

The subject matter disclosed herein relates generally to gear pumps, and more particularly, to a bearing and gear arrangement for a gear pump used in an aircraft Fuel Metering Unit (FMU).

Gear pumps often include two gears, usually of a similar configuration, that mesh with each other inside of a housing. A first or drive gear is an extension of a drive shaft; as it rotates, it drives a second gear, commonly referred to as the driven gear. As the gears rotate within the housing, fluid is transferred from an inlet to an outlet of the pump. Either spur gears or helical gears may be used, however, spur gears are most common.

The volume of fluid pumped through a gear pump depends partially on the depth of the tooth, the tooth diameter, and the width of the gear. Larger volumetric output is realized when fewer gear teeth having large working tooth depths and face widths are used. As the spur gear rotates, individual segments of fluid are released between the teeth to the outlet, thereby pulsing or rippling the output flow.

When larger gear pumps are operated at extremely high speeds, the surfaces of the gear teeth and bearings experience cavitation erosion. Cavitation erosion results in the pitting of the surfaces of the gear teeth and bearings and can eventually result in degraded pump volumetric capacity and durability. As the gears rotate through their mesh cycle, an opening inter-tooth volume is formed. As the meshing zone volume increases in size from minimum to maximum, the pressure within this meshing zone volume decreases below the true vapor pressure and vapor bubbles or cavities are formed. As the gears continue to rotate and the volume is further filled, this volume is subjected to higher pressure. As a result, the vapor formed within the inter-tooth volume is either forced back into the solution or collapsed as the cavitation phenomena. The vapor collapsing energy associated with this phase change is significant, and the vapor cavity, in effect, implodes on the gear teeth and bearing surfaces, thus resulting in cavitation erosion damage.

BRIEF DESCRIPTION OF THE INVENTION

According to an embodiment of the invention, a main gear pump is provided including a drive gear having a plurality of drive gear teeth. A driven gear includes a plurality of driven gear teeth. The driven gear is spaced apart from the drive gear such that the driven gear teeth and the drive gear teeth are in meshing engagement. The main gear pump includes at least one drive bearing arranged next to the drive gear such that a first relief and a second relief of the drive bearing face the drive gear. At least one driven bearing is positioned next to the driven gear such that a third relief and a fourth relief of the driven bearing face the driven gear. The drive gear has 15 drive gear teeth and the driven gear has 13 driven gear teeth. Both the drive gear and the driven gear have a width of about 0.6635 inches (1.685 cm). The drive gear has a width to outer diameter ratio of about 0.321 and the driven gear has a width to outer diameter ratio of about 0.364.

According to another embodiment of the invention, a servo gear pump is provided including a drive gear having a plurality of drive gear teeth. A driven gear includes a plurality of driven gear teeth. The driven gear is spaced apart from the drive gear such that the driven gear teeth and the drive gear teeth are in meshing engagement. The main gear pump includes at least one drive bearing arranged next to the drive gear such that a first relief and a second relief of the drive bearing face the drive gear. At least one driven bearing is positioned next to the driven gear such that a third relief and a fourth relief of the driven bearing face the driven gear. The drive gear and the driven gear are substantially identical and have a width of about 0.57 inches (1.45 cm) and a width to outer diameter ratio of about 0.329.

According to yet another embodiment of the invention, an aircraft is provided including a main gear pump having a main drive gear and a main driven gear and a servo gear pump having a servo drive gear and a servo driven gear. The main drive gear and the servo drive gear are received on an input shaft. The main driven gear is mounted to a first shaft oriented parallel to and adjacent a first side of the input shaft. The main driven gear is in meshing engagement with the main drive gear. The servo drive gear is mounted to a second shaft arranged parallel to and adjacent a second, opposite side of the input shaft. The servo driven gear is in meshing engagement with the servo drive gear.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
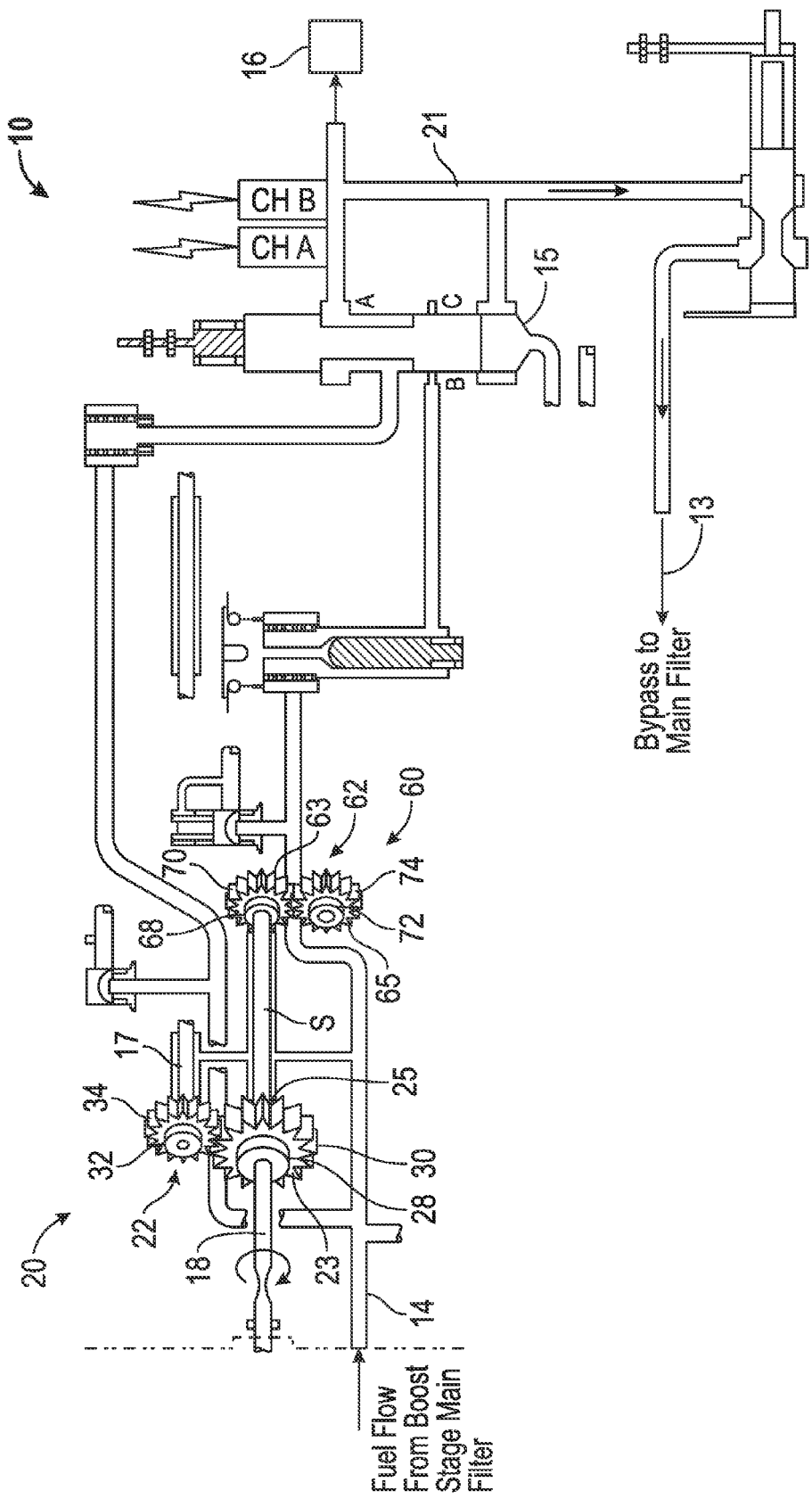
FIG. 1 is a schematic illustration of a portion of a fuel system of an aircraft.
Figure 4:
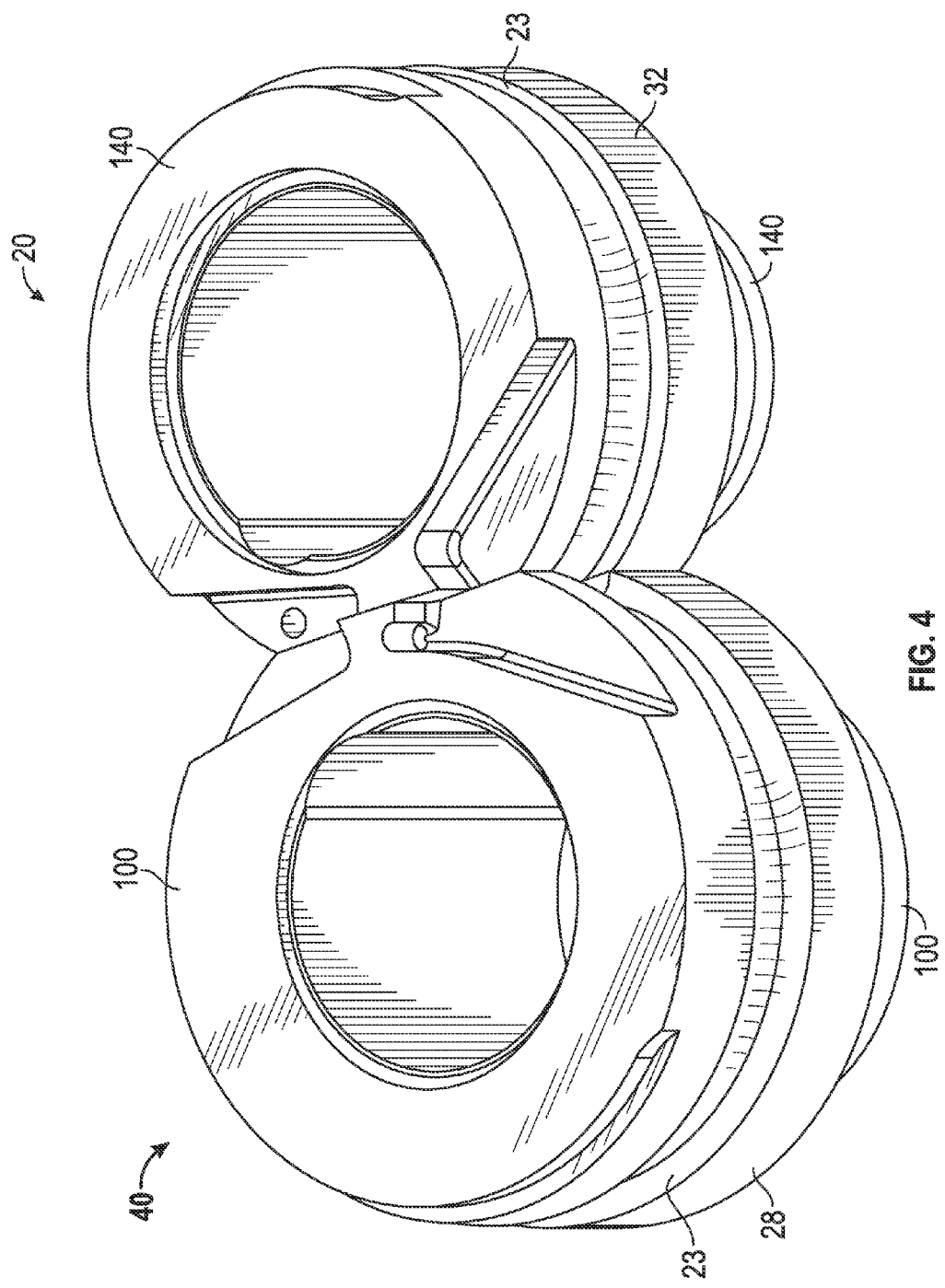
FIG. 4 is a perspective view of a bearing pair of a main gear pump according to an embodiment of the invention.
Figure 5:
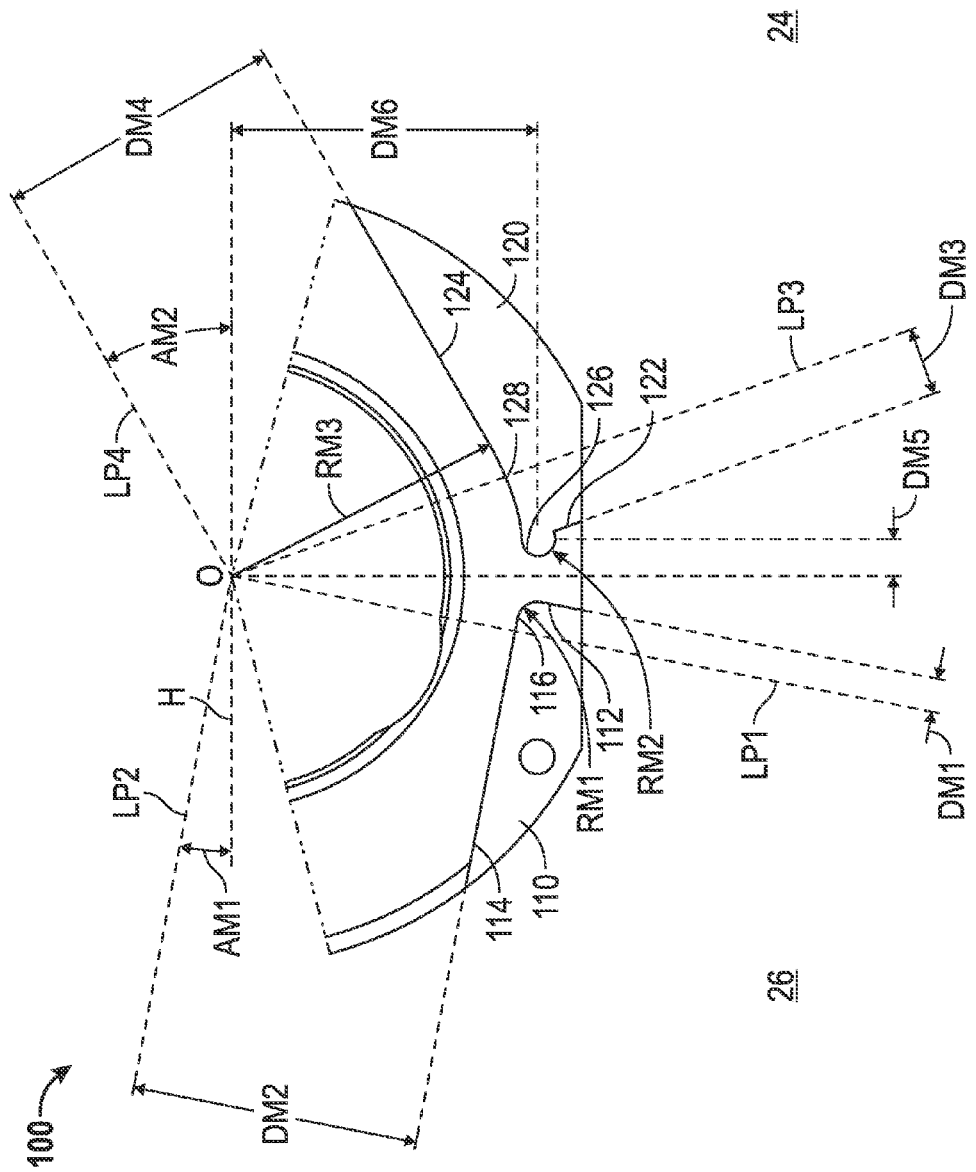
FIG. 5 is a top view of a drive bearing of a main gear pump according to an embodiment of the invention.

Referring now to the drawings, FIG. 1 is a schematic illustration of a fuel metering unit 10 in a portion of an aircraft turbine engine. A fuel flow conduit 14 is connected to both a main gear pump 20 and a servo gear pump 60. Both the main gear pump 20 and the servo gear pump 60 operate in the same housing to supply fuel to an engine 16 and include a pair of gears 22, 62 respectively. A first gear 28 of the main gear pump 20 and a first gear 68 of the servo gear pump 60, also referred to as the drive gears, operate on the same input shaft 18 separated by a distance S. In one embodiment, shaft 18 includes two shafts coupled together. The second gear 32 or driven gear, of the main gear pump 20 is positioned to one side of the input shaft 18 such that the teeth 34 of the main driven gear 32 are in meshing engagement with the teeth 30 of the main drive gear 28. The second gear 32 of the main gear pump 20 is also mounted on a shaft 17 having a rotational axis X1 (FIG. 2) parallel to the rotational axis Y1 (FIG. 2) of the input shaft 18. In one embodiment, the shaft 17 of the second gear 32 is coupled to the central boost pump of the aircraft. A pair of main bearings 40 (see FIG. 4) is positioned directly adjacent a first side 23 of the main gear pair 22, and a pair of main bearings 40 is disposed on the opposite side 25 of the main gear pair 22. The pair of main bearings 40 includes a drive bearing 100 (FIG. 5) received on the input shaft 18 and a driven bearing 140 (FIG. 6) received on a parallel shaft 17 with the second gear 32. In one embodiment, the main bearing pairs 40 located on opposite sides of the gear pair 22 are symmetrical.

Figure 8:
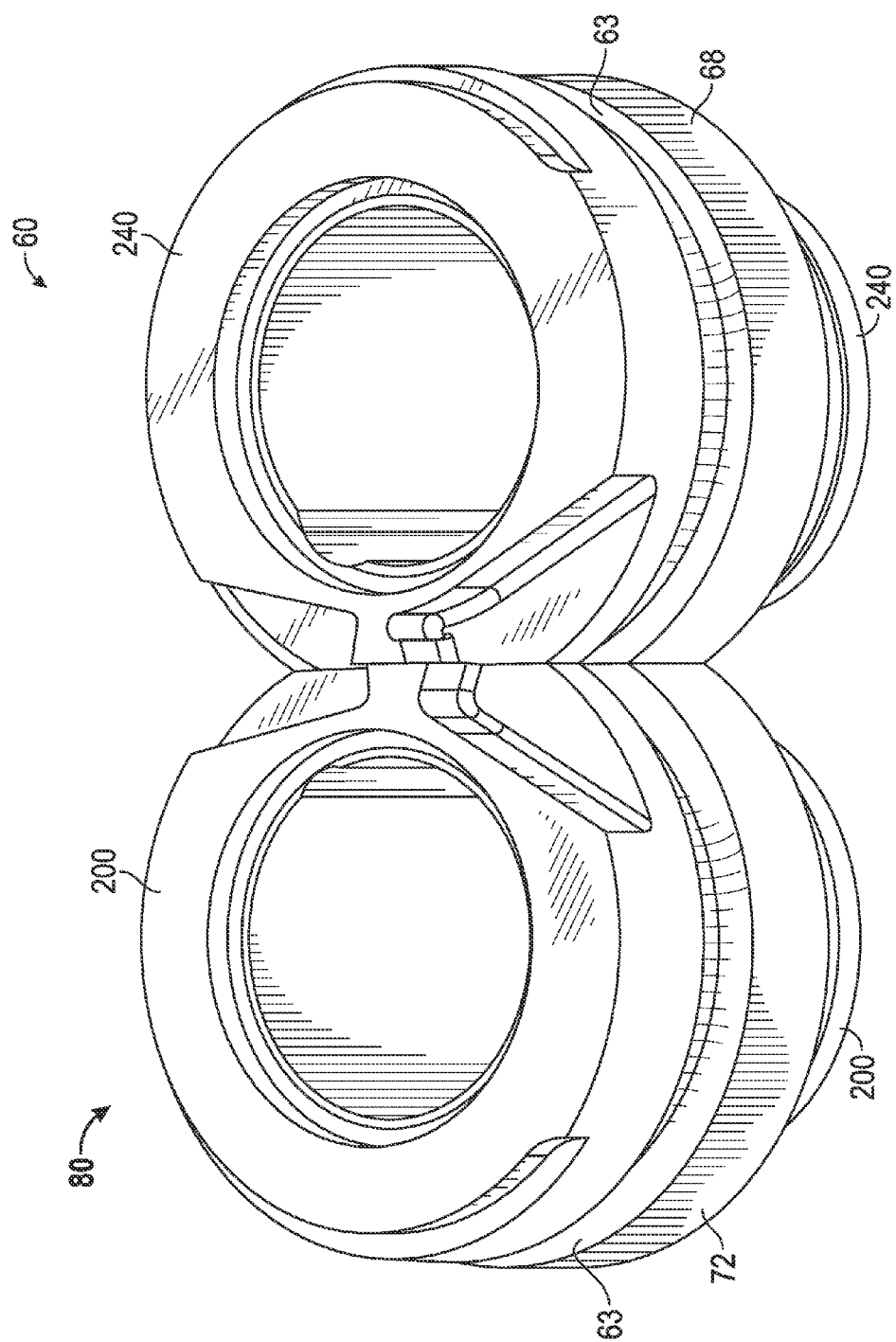
FIG. 8 is a perspective view of a bearing pair of a servo gear pump according to an embodiment of the invention.
Figure 9:
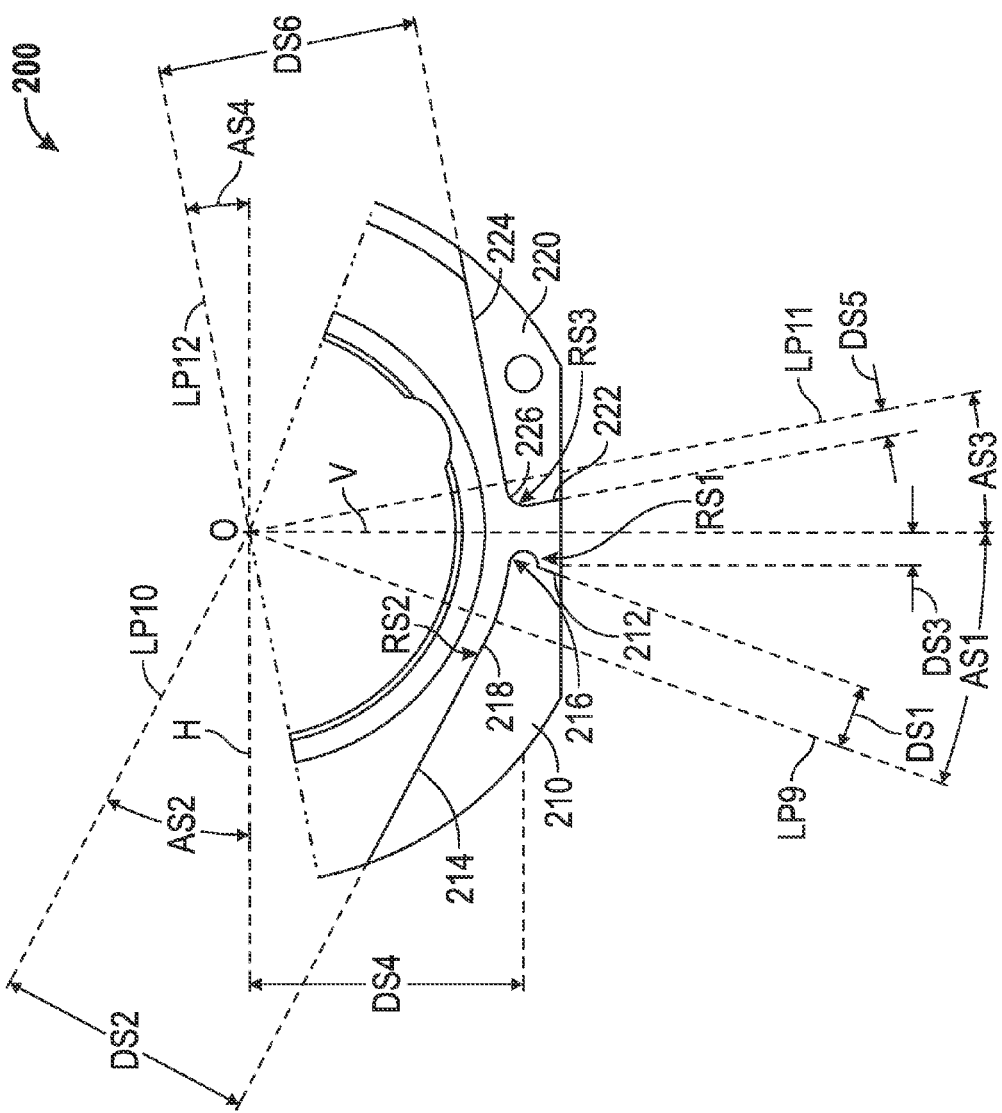
FIG. 9 is a top view of a drive bearing of a servo gear pump according to an embodiment of the invention.

The second gear 72 of the servo gear pump 60 is positioned on the opposite side of the input shaft 18 as the main second gear 32. The second gear 72 of the servo pump is mounted to a shaft (not shown) parallel to the input shaft 18. The driven servo gear 72 is located such that the teeth 74 of the servo driven gear 72 are in meshing engagement with the teeth 70 of the servo drive gear 68. A pair of servo bearings 80 (see FIG. 8) is positioned adjacent a first surface 63 of the servo gear pair 62. The pair of servo bearings 80 includes a drive bearing 200 (FIG. 9) and a driven bearing 240 (FIG. 10) which are received on the input shaft 18 and a parallel shaft (not shown) respectively. A second, symmetrical pair of servo bearings 80 is similarly positioned adjacent a second, opposite surface of the servo gear pair 62.

When the input shaft 18 rotates, the main drive gear 28 and the servo drive gear 68 engage their respective driven gears 32, 72 causing them to rotate. The flight condition of the aircraft determines the flow rate at which engine fuel travels through the pump sharing valve 15 to a conduit 21. Depending on the flight condition, the engine fuel flows to either the main gear pump 20, the servo gear pump 60, or both gear pumps. Under some flight conditions, the bypass pressure regulating valve 13 pumps engine fuel back to a main filter to have the most efficient power operation.

Figure 2:
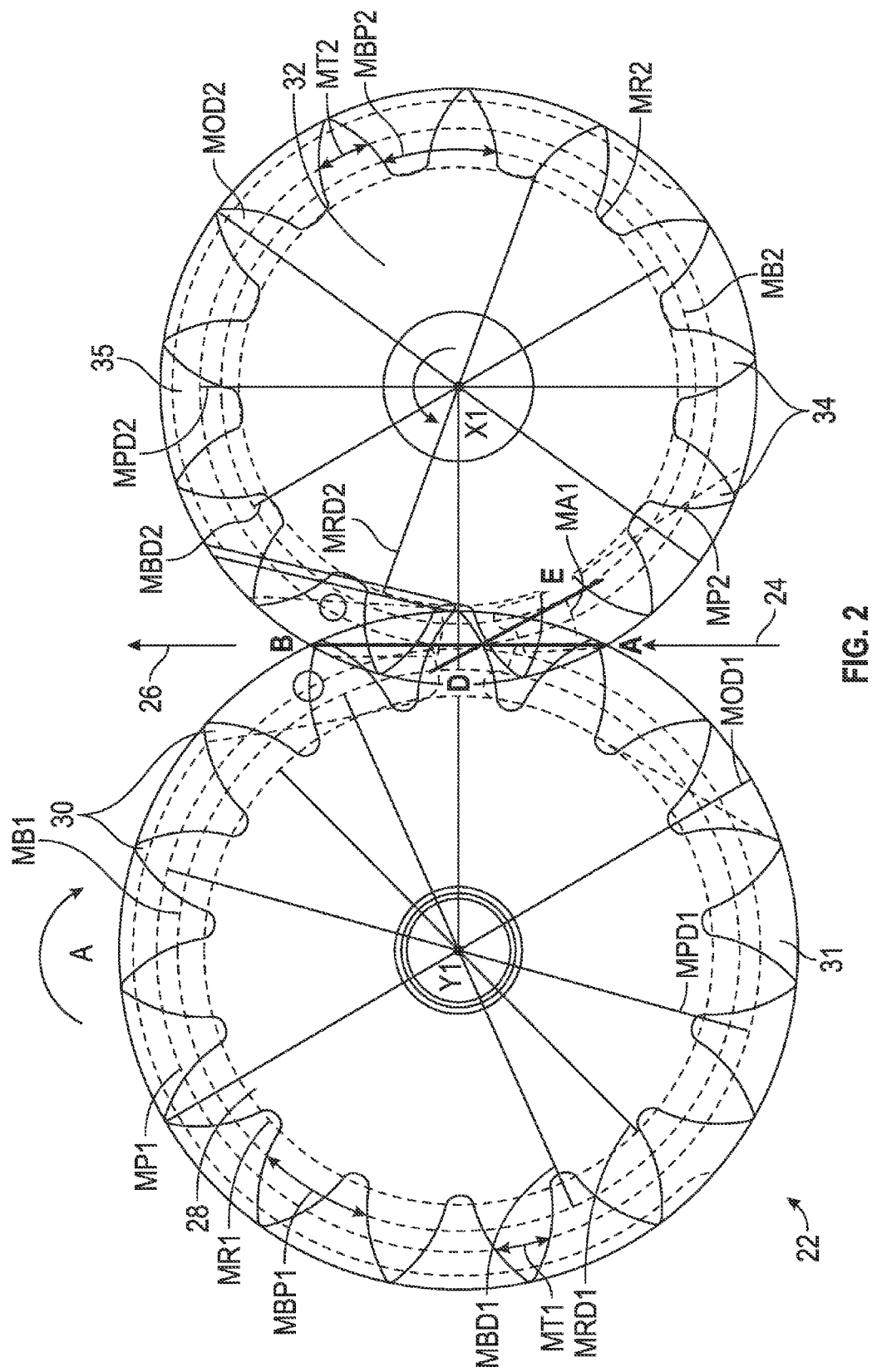
FIG. 2 is a top view of a gear pair of a main gear pump according to an embodiment of the invention.

Referring now to FIG. 2, a detailed side view is shown for both the main drive gear 28 and the main driven gear 32 of the main gear pump 20. When the pump 20 is operating, the main drive gear 28 rotates in the direction indicated by arrow A such that fluid passes through the gear teeth pockets 31, 35 (i.e., a space between each tooth) from an inlet 24 to an outlet 26. The main drive gear 28 has more teeth 30 than the main driven gear 32. In one embodiment, the main drive gear 28 has 15 teeth and the main driven gear 32 has 13 teeth. The main drive gear 28 rotates about an axis Y1 and the main driven gear 32 rotates about an axis X1 (axes X1 and Y1 pass through the plane of the paper). Each of the main drive gear 28 and the main driven gear 32 has a respective pitch circle MP1, MP2, base circle MB1, MB2, and root circle MR1, MR2. In one embodiment, the diameter MPD1 of the pitch circle MP1 of the main drive gear 28 is about 1.8349 inches (4.66 centimeters) and the diameter MPD2 of the pitch circle MP2 of the main driven gear 32 is about 1.5902 inches (4.04 centimeters). In one embodiment, the diameter MBD1 of the base circle MB1 of the drive gear 28 is about 1.589 inches (4.04 centimeters) and the diameter MBD2 of the base circle MD2 of the driven gear 32 is about 1.377 (3.50 centimeters). In one embodiment, the diameter MRD1 of the root circle MR1 of the drive gear 28 is about 1.541 inches (3.91 centimeters) and the diameter MRD2 of the root circle MR2 of the driven gear 32 is about 1.279 inches (3.25 centimeters). The main drive gear 28 may be larger than the main driven gear 32. In one embodiment, the main drive gear 28 has an outer diameter MOD1 of about 2.07 inches (5.26 centimeters) and the main driven gear 32 has an outer diameter MOD2 of about 1.825 inches (4.64 centimeters).

Line DE, passing through the pitch point, is tangent to both base circles MB1, MB2, and is normal to the teeth that are in contact. Line AB is perpendicular to the center line at the pitch point. A pressure angle MA is the angle formed between AB and DE, and is therefore the same for both gears 28, 32. In one embodiment, the pressure angle MA of both the main drive gear 28 and the main driven gear 32 is about 30 degrees. The thickness MT1, MT2 of a tooth 30, 34 is the average width of the tooth 30, 34 measured along the arc of the pitch circle MP1, MP2. In one embodiment, the main drive gear 28 has a tooth thickness of about 0.190 inches (0.483 centimeters) and the main driven gear 32 has a tooth thickness of about 0.191 inches (0.485 centimeters). The base pitch MBP1, MBP2, is the distance from one face of a tooth 30, 34 to the corresponding face of an adjacent tooth 30, 34 on the same gear, measured along the base circle MB1, MB2. In one embodiment, the main drive gear 28 and the main driven gear 32 have a base pitch MBP1, MPB2 of about 0.3328 inches (0.845 centimeters). The width of the main drive gear 28 is the same as the width of the main driven gear 32. In one embodiment, both the main drive gear 28 and the main driven gear 32 have a width of about 0.6635 inches (1.685 centimeters). The gear width and the gear outer diameter may also be expressed as a ratio. In one embodiment, the gear width to gear outer diameter ratio of the main drive gear 28 is about 0.321 and the gear width to gear outer diameter ratio of the main driven gear 32 is about 0.364.

Figure 3:
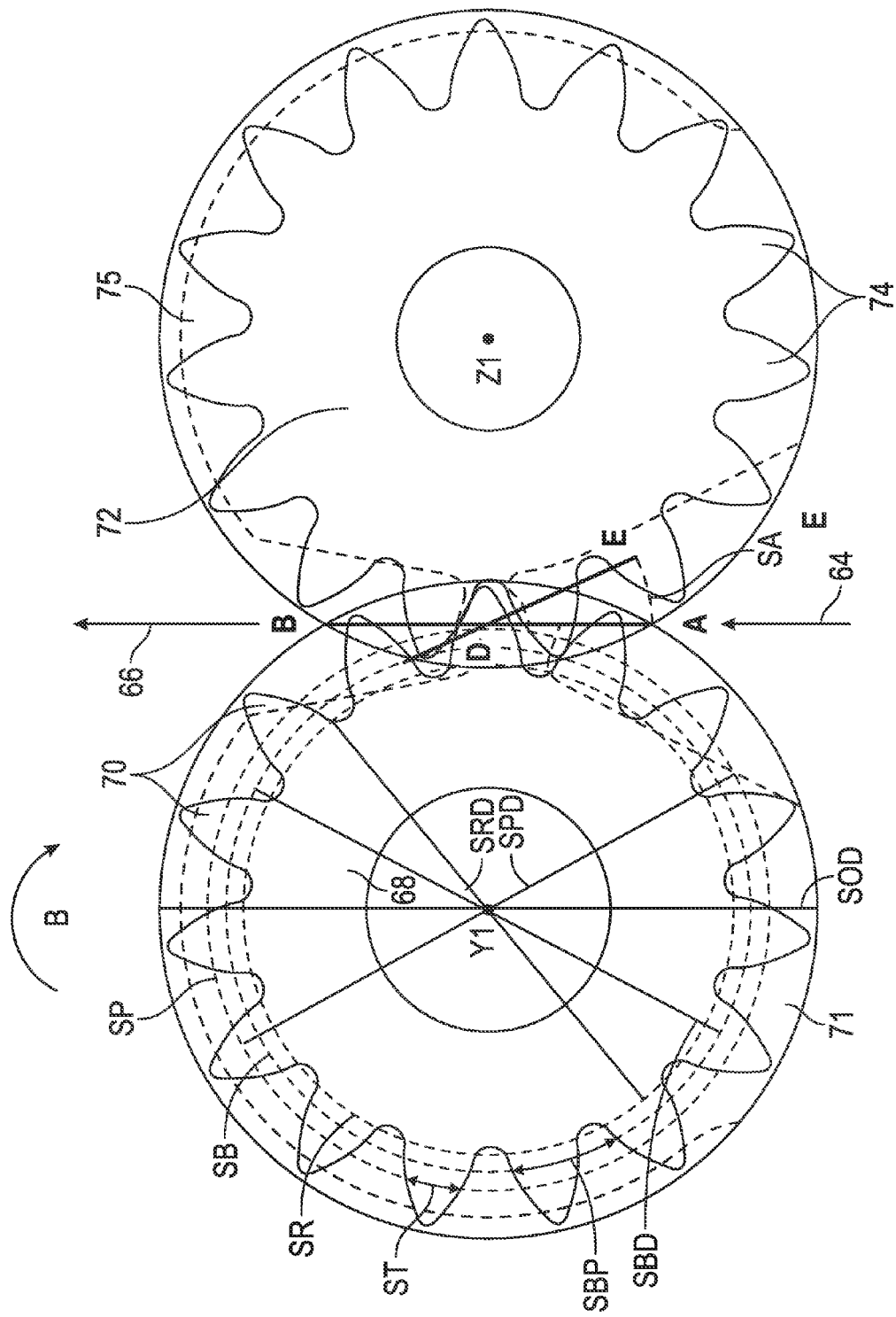
FIG. 3 is a top view of a gear pair of a servo gear pump according to an embodiment of the invention.

FIG. 3 illustrates a top view of both the servo drive gear 68 and the servo driven gear 72. When the pump 60 is operating, the servo drive gear 68 rotates in the direction indicated by arrow B such that fluid passes through the gear teeth pockets 71, 75 from an inlet 64 to an outlet 66 of the pump 60. As illustrated, the servo drive gear 68 may be substantially identical to the servo driven gear 72. In such instances, the servo drive gear 68 and the servo driven gear 72 have the same number of teeth 70, 74. In one embodiment, both the servo drive gear 68 and the servo driven gear 72 have 15 teeth. The servo drive gear 68 rotates about the axis Y1 and the servo driven gear 72 rotates about an axis Z1 (axes Y1 and Z1 pass through the plane of the paper). As is common to all gears, each of the servo drive gear 68 and the servo driven gear 72 has a respective pitch circle SP, base circle SB, and root circle SR. In one embodiment, the diameter SPD of the pitch circle SP of the servo drive gear 68 and the servo driven gear 72 is about 1.5385 inches (3.91 centimeters). In one embodiment, the diameter SBD of the base circle SB of both the drive gear 68 and the driven gear 72 is about 1.358 inches (3.45 centimeters). In one embodiment, the diameter SRD of the root circle SR of the drive gear 68 and the driven gear 72 is about 1.292 inches (3.28 centimeters). In one embodiment, the servo drive gear 68 and the servo driven gear 72 have an outer diameter SOD of about 1.7345 inches (4.41 centimeters). The pressure angle SA of the servo gears 68, 72 may be 28 degrees and the tooth thickness may be 0.1611 inches (0.409 centimeters). The base pitch of the servo drive gear 68 and the servo driven gear 72 may be about 0.2845 inches (0.723 centimeters). The width of the servo gear pair 62 may be 0.57 inches (1.45 centimeters) such that the gears 68, 72 have a gear width to outer diameter ratio of about 0.329.

Referring now to FIGS. 4-7, an exemplary main bearing pair 40 including a drive bearing 100 and a driven bearing 140 is illustrated in more detail. Both the drive bearing 100 and the driven bearing 140 are provided with a first relief 110, 150 and a second relief 120, 160. The surfaces of the bearings 100, 140 including the reliefs are arranged directly adjacent the gear pair 22 (FIG. 1) such that the one of the reliefs 120, 160 of each bearing 100, 140 communicates with an inlet 24 (FIG. 2) and the other of the reliefs 110, 150 communicates with the outlet 26 (FIG. 2) of the main gear pump 20.

The outlet relief 110 of the main drive bearing 100 (see FIG. 5) includes a first flycut 112 and a second flycut 114 connected by a curved portion 116. The first flycut 112 of the outlet relief 110 is a lateral distance DM1 from a line LP1 parallel to the first flycut 112 that passes through the center O of the drive bearing 100. In one embodiment, lateral distance DM1 is about 0.090 inches (0.229 centimeters). The second flycut 114 of the relief 110 is located at a radial distance DM2 from line LP2 parallel to the second flycut 114 that passes through the center O of the drive bearing 100. In one embodiment, radial distance DM2 is about 0.765 inches (1.94 centimeters). The line LP2 parallel to the second flycut 114 is formed at an angle AM1 relative to horizontal H. In one embodiment, angle AM1 is about 11 degrees. The curved portion 116 connecting the first and second flycuts 112, 114 has a radius RM1. In one embodiment, radius RM1 is 0.060 inches (0.152 centimeters).

The inlet relief 120 of the main drive bearing 100 also includes a first flycut 122 and a second flycut 124 connected by a finger having a first curved portion 126 and a second curved portion 128. The first flycut 122 of the inlet relief 120 is a lateral distance DM3 from a line LP3 parallel to the first flycut 122 that passes through the center O of the drive bearing 100. In one embodiment, lateral distance DM3 is about 0.180 inches (0.457 centimeters). The second flycut 124 of the relief 120 is located at a radial distance DM4 from a line LP4 parallel to the second flycut 124 that passes through the center O of the drive bearing 100. Radial distance DM4 may be equal to radial distance DM2. In one embodiment, radial distance DM4 is about 0.765 inches (1.94 centimeters). The line LP4 parallel to the second flycut 124 extends at an angle AM2 relative to horizontal H. In one embodiment, angle AM2 is about 30 degrees. The first curved portion 126 and the second curved portion 128 have a radius RM2 and RM3 respectively. In one embodiment, radius RM2 is about 0.045 inches (0.114 centimeters) and radius RM3 is about 0.765 inches (1.94 centimeters). The origin of the first curved portion 126 is a horizontal or lateral distance DM5 and a vertical distance DM6 from the center O of the bearing. In one embodiment, horizontal distance DM5 is about 0.099 inches (0.251 centimeters) and vertical distance DM6 is about 0.810 inches (2.06 centimeters).

Figure 6:
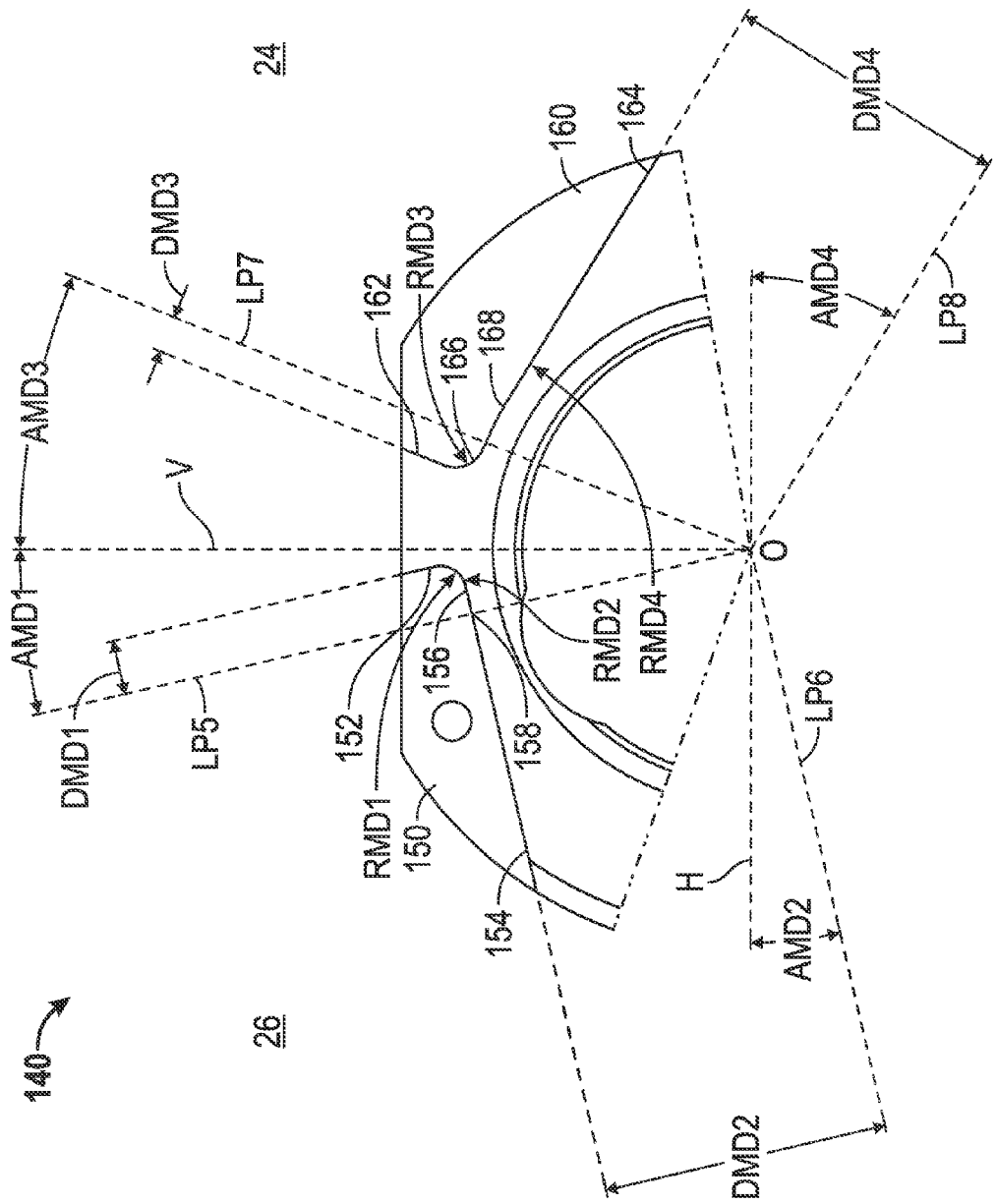
FIG. 6 is a top view of a driven bearing of a main gear pump according to an embodiment of the invention.
Figure 7:
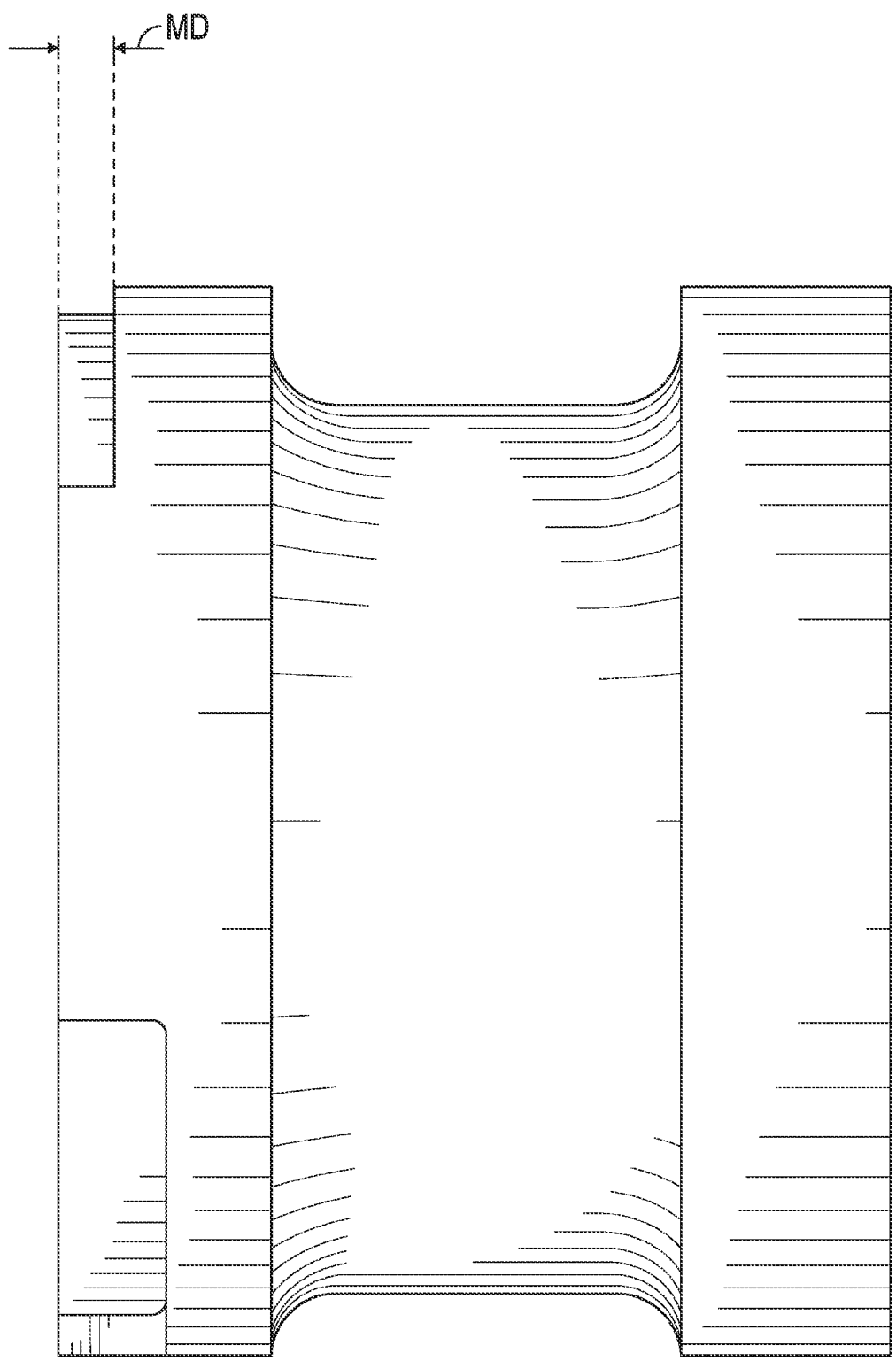
FIG. 7 is a side view of a bearing of a main gear pump according to an embodiment of the invention.

The main driven bearing 140 shown in FIG. 6 includes an outlet relief 150 having a first flycut 152 and a second flycut 154 connected by a first curved portion 156 and a second curved portion 158. The first flycut 152 of the relief 150 is a lateral distance DMD1 from a line LP5 parallel to the first flycut 152 that passes through the center O of the driven bearing 140. The line LP5 parallel to the first flycut 152 is formed at an angle AMD1 relative to vertical V. In one embodiment, angle AMD1 is about 13 degrees and distance lateral DMD1 is about 0.120 inches (0.305 centimeters). The second flycut 154 of the outlet relief 150 is located at a radial distance DMD2 from a line LP6 parallel to the second flycut 154 that passes through the center O of the driven bearing 140. The line LP6 parallel to the second flycut 154 is formed at an angle AMD2 relative to horizontal H. In one embodiment, radial distance DMD2 is about 0.647 inches (1.64 centimeters) and angle AMD2 is about 13 degrees. The first curved portion 156 and the second curved portion 158 have a radius RMD1 and RMD2 respectively. In one embodiment, radius RMD1 is about 0.060 inches (0.152 centimeters) and radius RMD2 is about 0.647 inches (1.64 centimeters).

Inlet relief 160 of the main driven bearing 140 also includes a first flycut 162 and a second flycut 164 connected by a first curved portion 166 and a second curved portion 168. The first flycut 162 of the relief 160 is a lateral distance DMD3 from a line LP7 parallel to the first flycut 162 that passes through the center O of the driven bearing 140. The line LP7 parallel to the first flycut 162 is formed at an angle AMD3 relative to vertical V. In one embodiment, angle AMD3 is about 22 degrees and distance DMD3 is about 0.080 inches (0.203 centimeters). The second flycut 164 of the inlet relief 160 is located at a distance radial DMD4 from a line LP8 parallel to the second flycut 164 that passes through the center O of the driven bearing 140. Radial distance DMD4 may be equal to radial distance DMD2. In one embodiment, radial distance DMD4 is about 0.647 inches (1.64 centimeters). The line LP8 parallel to the second flycut 164 extends at an angle AMD4 relative to horizontal H. In one embodiment, angle AMD4 is about 32 degrees. The first curved portion 166 and the second curved portion 168 have a radius RMD3 and RMD4 respectively. Radius RMD3 may be equal to radius RMD1 and radius RMD4 may be equal to radius RMD2. In one embodiment, radius RMD3 is about 0.060 inches (0.152 centimeters) and radius RMD4 is about 0.647 inches (1.64 centimeters). Each of the plurality of reliefs 110, 120, 150, 160 of the main bearing pair 40 may have a uniform depth MD (see FIG. 7). In one embodiment, the depth MD is about 0.100 inches (0.254 centimeters) and has a tolerance of about 0.01 inches (0.0254 centimeters).

Referring now to FIGS. 8-11 an exemplary bearing pair of servo bearings 80 including a servo drive bearing 200 and a servo driven bearing 240 is illustrated in more detail. Both the drive bearing 200 and the driven bearing 240 are provided with a pair of reliefs 210, 220 and 250, 260 respectively. The surfaces of the bearings 200, 240 including the reliefs are arranged directly adjacent the servo gear pair 62 such that the one of the reliefs 210, 250 of each bearing 100, 140 communicates with an inlet 64 and the other of the reliefs 220, 260 communicates with the outlet 66 of the servo gear pump 60.

The inlet relief 210 of the servo drive bearing 200 includes a first flycut 212 and a second flycut 214 connected by a finger having a first curved portion 216 and a second curved portion 218. The first flycut 212 of the relief 210 is a lateral distance DS1 from a line LP9 parallel to the first flycut 212 that passes through the center O of the drive bearing 200. The line LP9 parallel to the first flycut 212 is formed at an angle AS1 relative to vertical V. In one embodiment, angle AS1 is about 22 degrees and lateral distance DS1 is about 0.160 inches (0.406 centimeters). The second flycut 214 of the relief 210 is located at a radial distance DS2 from a line LP10 parallel to the second flycut 214 that passes through the center O of the drive bearing 200. The line LP10 parallel to the second flycut is formed at an angle AS2 relative to horizontal H. In one embodiment, radial distance DS2 is about 0.640 inches (1.63 centimeters) and angle AS2 is about 28 degrees. The first curved portion 216 and the second curved portion 218 have a radius RS1 and RS2 respectively. In one embodiment, radius RS1 is about 0.035 inches (0.114 centimeters) and RS2 is about 0.640 inches (1.63 centimeters). The origin of the first curved portion 216 is a horizontal distance DS3 and a vertical distance DS4 from the center O of the bearing 200. In one embodiment, horizontal distance DS3 is about 0.083 inches (0.211 centimeters) and vertical distance DS4 is about 0.675 inches (1.71 centimeters).

The outlet relief 220 of the servo drive bearing 200 includes a first flycut 222 and a second flycut 224 connected by a curved portion 226. The first flycut 222 of the relief 220 is a lateral distance DS5 from a line LP11 parallel to the first flycut 222 that passes through the center O of the drive bearing 200. The line LP11 parallel to the first flycut 222 is formed at an angle AS3 relative to vertical V. In one embodiment, angle AS3 is about 11 degrees and lateral distance DS5 is about 0.070 inches (0.178 centimeters). The second flycut 224 of the relief 220 is located at a radial distance DS6 from a line LP12 parallel to the second flycut 224 that passes through the center O of the drive bearing 200. The radial distance DS6 may be equal to radial distance DS2. In one embodiment, radial distance DS6 is equal to about 0.640 inches (1.63 centimeters). The line LP12 parallel to the second flycut 224 extends at an angle AS4 relative to horizontal H. In one embodiment, angle AS4 is about 11 degrees. The curved portion 226 connecting the first and second flycuts 222, 224 has a radius RS3. In one embodiment, radius RS3 is about 0.060 inches (0.152 centimeters).

Figure 10:
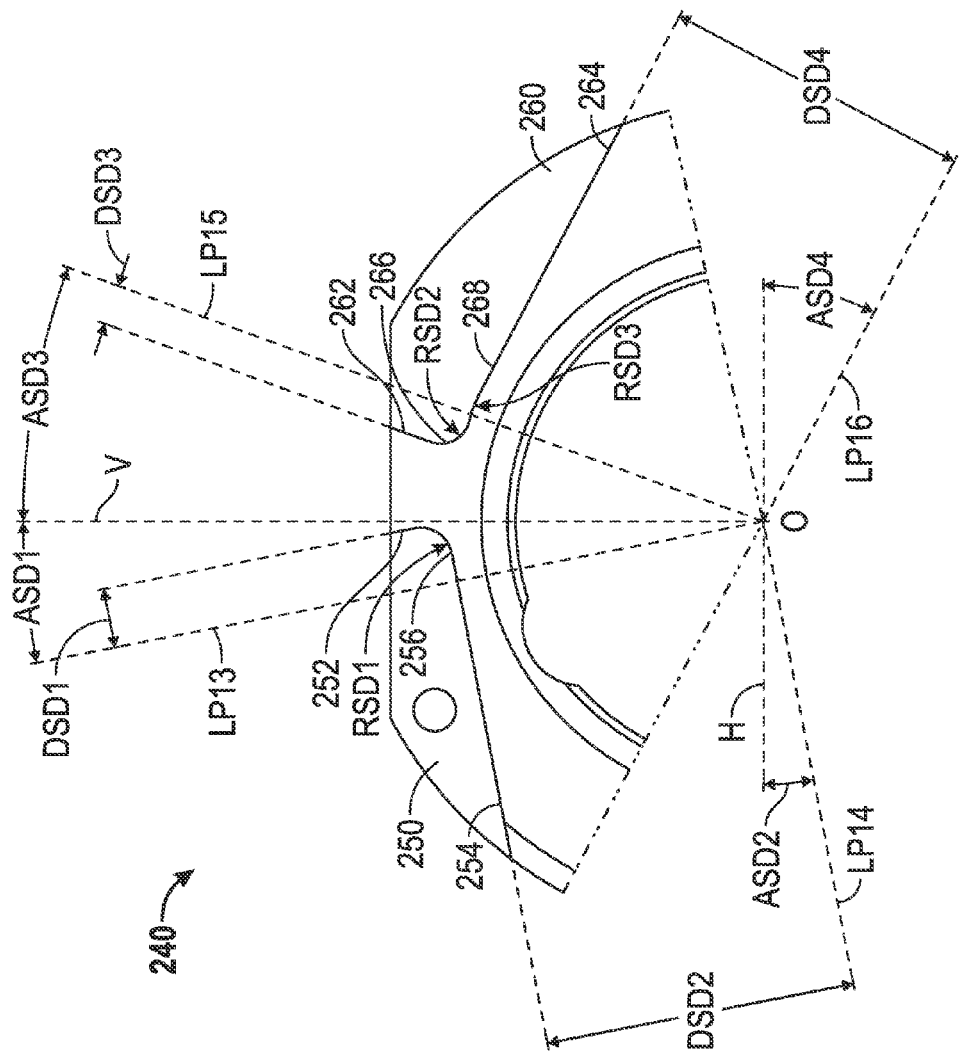
FIG. 10 is a top view of a driven bearing of a servo gear pump according to an embodiment of the invention.
Figure 11:
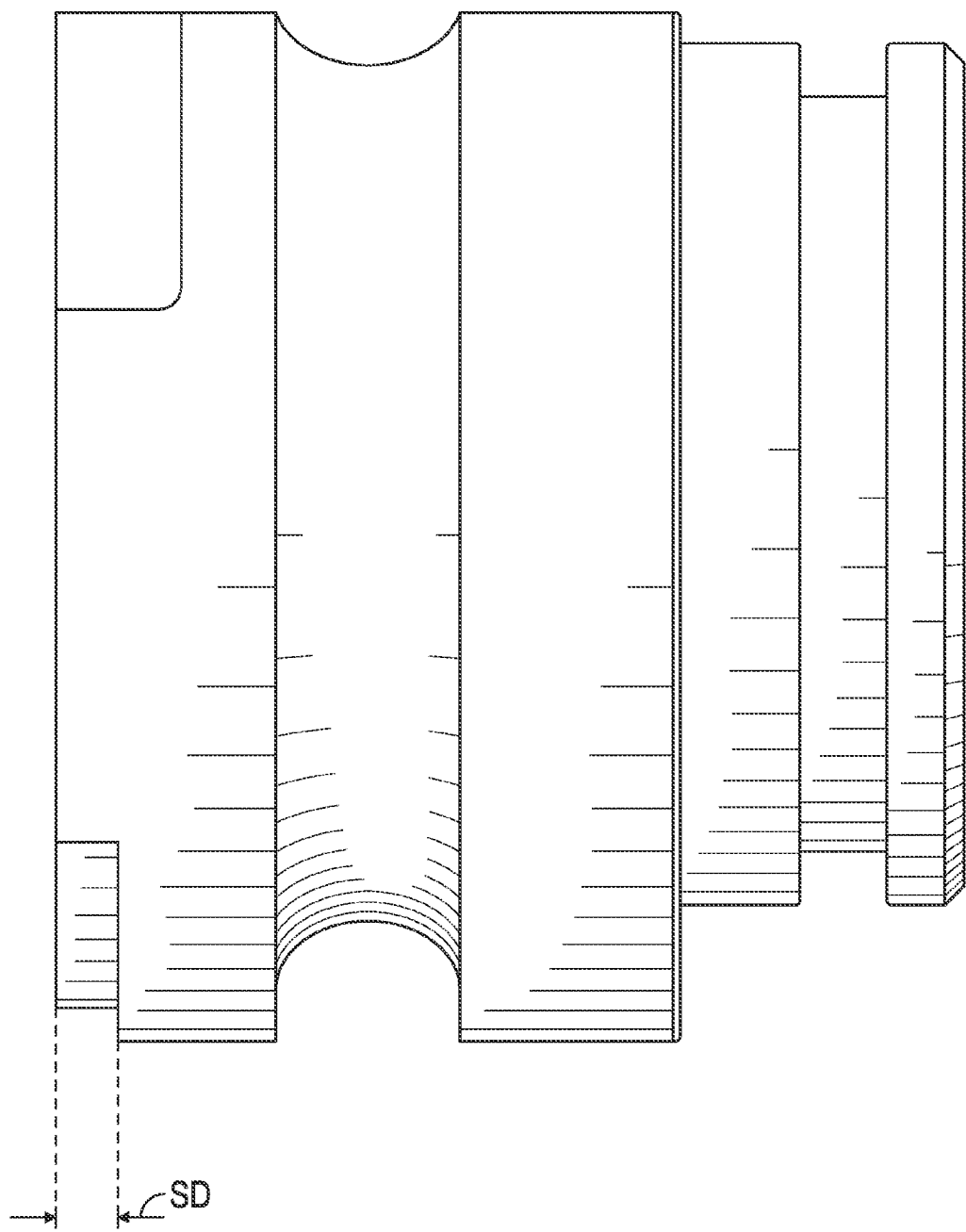
FIG. 11 is a side view of a bearing of a main gear pump according to an embodiment of the invention.

Referring now to the servo driven bearing 240 shown in FIG. 10, an inlet relief 250 includes a first flycut 252 and a second flycut 254 connected by a curved portion 256. The first flycut 252 of the inlet relief 250 is a lateral distance DSD1 from a line LP13 parallel to the first flycut 252 that passes through the center O of the driven bearing 240. The line LP13 parallel to the first flycut 252 is arranged at an angle ASD1 relative to vertical V. In one embodiment, angle ASD1 is about 20 degrees and lateral distance DSD1 is about 0.080 inches (0.203 centimeters). The second flycut 254 of the relief 250 is located at a radial distance DSD2 from a line LP14 parallel to the second flycut 254 that passes through the center O of the driven bearing 240. The line LP14 parallel to the second flycut 254 is arranged at an angle ASD2 relative to horizontal H. In one embodiment, radial distance DSD2 is about 0.640 inches (1.63 centimeters) and angle ASD2 is about 28 degrees. The curved portion 256 connecting the first and second flycuts 252, 254 has a radius RSD1. In one embodiment, radius RSD1 is about 0.060 inches (0.152 centimeters).

The outlet relief 260 of the servo driven bearing 240 includes a first flycut 262 and a second flycut 264 connected by a finger having a first curved portion 266 and a second curved portion 268. The first flycut 262 of the relief 260 is a lateral distance DSD3 from a line LP15 parallel to the first flycut 262 that passes through the center O of the driven bearing 240. The line LP15 parallel to the first flycut 262 is arranged at an angle ASD3 relative to vertical V. In one embodiment, angle ASD3 is about 11 degrees and lateral distance DSD3 is about 0.120 inches (0.305 centimeters). The second flycut 264 of the outlet relief 260 is located at a radial distance DSD4 from a line LP16 parallel to the second flycut 264 that passes through the center O of the driven bearing 240. Radial distance DSD4 may be equal to radial distance DSD2. In one embodiment, radial distance DSD4 is about 0.640 inches (1.63 centimeters). The line LP16 parallel to the second flycut 264 extends at an angle ASD4 relative to horizontal H. In one embodiment, angle ASD4 is about 11 degrees. The first curved portion 266 and the second curved portion 268 have a radius RSD2 and RSD3 respectively. In one embodiment, radius RSD2 is about 0.060 inches (0.152 centimeters) and radius RSD3 is about 0.640 inches (1.63 centimeters). Each of the plurality of reliefs 210, 220, 250, 260 of the servo bearing pair 80 may have a uniform depth SD (see FIG. 11). In one embodiment, the depth SD is about 0.100 inches (0.254 centimeters) and has a tolerance of about 0.01 inches (0.0254 centimeters).

The coordinated geometry of the gear pairs 22, 62 and the respective bearing pairs 40, 80 optimizes pump performance while minimizing cavitation and pressure ripple in the fuel system. The will reduce deterioration of the gears, bearings, housings, and other system components, thus maintaining pump and system performance and increasing component operating life. The reduced pressure ripple and cavitation will also create a more stable fuel system that can be more easily and accurately monitored and controlled. The bearing geometry also facilitates manufacturing, thereby reducing cost.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A main gear pump comprising:
a drive gear including a plurality of drive gear teeth;
a driven gear including a plurality of driven gear teeth wherein the driven gear is spaced apart from the drive gear such that the driven gear teeth and the drive gear teeth are in meshing engagement;
at least one drive bearing arranged next to the drive gear such that a surface of the drive bearing facing the drive gear includes a first relief and a second relief;
at least one driven bearing positioned next to the driven gear such that a surface of the driven bearing facing the driven gear includes a third relief and a fourth relief; and
wherein the drive gear has 15 drive gear teeth and the driven gear has 13 driven gear teeth, and both the drive gear and the driven gear have a width of about 0.6635 inches (1.685 cm) such that the drive gear has a width to outer diameter ratio of about 0.321, and the width to outer diameter ratio of the driven gear is about 0.364.

2. The main gear pump according to claim 1, wherein the drive gear has a pitch diameter of about 1.8349 inches (4.66 cm), a gear outer diameter of about 2.07 inches (5.26 cm), a root diameter of about 1.541 inches (3.91 cm), and a base diameter of about 1.589 inches (4.04 cm).

3. The main gear pump according to claim 1, wherein the driven gear has a pitch diameter of about 1.5902 inches (4.04 cm), a gear outer diameter of about 1.8252 inches (4.64 cm), a root diameter of about 1.297 inches (3.25 cm), and a base diameter of about 1.377 inches (3.50 cm).

4. The main gear pump according to claim 1, wherein the drive gear teeth have a thickness of about 0.1900 inches (0.483 cm), and the driven gear teeth have a thickness of about 0.1910 inches (0.485 cm).

5. The main gear pump according to claim 1, wherein both the drive gear and the driven gear have a base pitch of about 0.3328 inches (0.845 cm), and a pressure angle of about 30 degrees.

6. The main gear pump according to claim 1, wherein the first relief includes a first flycut, a second flycut, and a curved portion, and the first flycut is a lateral distance 0.090 inches (0.229 cm) from a center of the drive bearing, the second flycut is a radial distance 0.765 inches (1.94 cm) from the center of the drive bearing, the second flycut is arranged at a 11 degree angle to the center of the drive bearing, and the curved portion has a radius of about 0.060 inches (0.152 cm).

7. The main gear pump according to claim 1, wherein the second relief includes a third flycut, a fourth flycut, a second curved portion, and a third curved portion, and the third flycut is a lateral distance 0.180 inches (0.457 cm) from a center of the drive bearing, the fourth flycut is a radial distance 0.765 inches (1.94 cm) from the center of the drive bearing, the fourth flycut is arranged at a 30 degree angle to the center of the drive bearing, the second curved portion has a radius of about 0.045 inches (0.114 cm) and the third curved portion has a radius of about 0.765 inches (1.94 cm).

8. The main gear pump according to claim 7, wherein an origin of the second curved portion is a horizontal distance 0.099 inches (0.251 cm) and a vertical distance 0.810 inches (2.06 cm) from the center of the drive bearing.

9. The main gear pump according to claim 1, wherein the third relief includes a fifth flycut, a sixth flycut, a fourth curved portion, and a fifth curved portion, and the fifth flycut is a lateral distance 0.120 inches (0.305 cm) from a center of the driven bearing, the fifth flycut being arranged at a 13 degree angle to the center of the driven bearing, the sixth flycut is a radial distance 0.647 inches (1.64 cm) from the center of the driven bearing and is arranged at a 13 degree angle to the center of the driven bearing, the fourth curved portion has a radius of about 0.060 inches (0.152 cm) and the fifth curved portion has a radius of about 0.647 inches (1.64 cm).

10. The main gear pump according to claim 1, wherein the fourth relief includes a seventh flycut, an eight flycut, and a sixth curved portion, and a seventh curved portion, and the seventh flycut is a lateral distance 0.080 inches (0.203 cm) from a center of the driven bearing, the seventh flycut being arranged at a 22 degree angle to the center of the driven bearing, the eight flycut is a radial distance 0.647 inches (1.64 cm) from the center of the driven bearing, the eight flycut being arranged at a 32 degree angle to the center of the driven bearing, and the sixth curved portion has a radius of about 0.060 inches (0.152 cm) and the seventh curved portion has a radius of about 0.647 inches (1.64 cm).

11. The main gear pump according to claim 1, wherein the drive bearing and the driven bearing have a depth of about 0.100 inches (0.0254 cm).

12. A servo gear pump comprising:
a drive gear including a plurality of drive gear teeth;
a driven gear including a plurality of drive gear teeth wherein the driven gear is spaced apart from the drive gear such that the driven gear teeth and the drive gear teeth are in meshing engagement;
at least one drive bearing arranged next to the drive gear such that a surface of the drive bearing facing the drive gear includes a first relief and a second relief;
at least one driven bearing positioned next to the driven gear such that a surface of the driven bearing facing the driven gear includes a third relief and a fourth relief; and
wherein the drive gear and the driven gear are identical, and have a width of about 0.57 inches (1.45 cm) such that the drive gear and driven gear have a width to outer diameter ratio of about of about 0.329.

13. The servo gear pump according to claim 12, wherein the drive gear and the driven gear have 15 teeth, a pressure angle of about 28 degrees, a base pitch of about 0.2845 inches (0.723 cm) and a tooth thickness of about 0.1611 inches (0.409 cm).

14. The servo gear pump according to claim 12, wherein the drive gear and the driven gear have a pitch diameter of about 1.5385 inches (3.91 cm), a gear outer diameter of about 1.7345 inches (4.41 cm), a root diameter of about 1.292 inches (3.28 cm), and a base diameter of about 1.358 inches (3.45 cm).

15. The servo gear pump according to claim 12, wherein the first relief includes a first flycut, a second flycut, a first curved portion and a second curved portion, wherein the first flycut is a lateral distance 0.160 inches (0.406 cm) from a center of the drive bearing arranged at a 22 degree angle to the center of the drive bearing, the second flycut is a radial distance 0.640 inches (1.63 cm) from the center of the drive bearing, the second flycut being arranged at a 28 degree angle to the center of the drive bearing, the first curved portion has a radius of about 0.035 inches (0.114 cm) and the second curved portion has a radius of about 0.640 inches (1.63 cm).

16. The servo gear pump according to claim 15, wherein an origin of the first curved portion is a horizontal distance 0.083 inches (0.211 cm) and a vertical distance 0.675 inches (1.71 cm) from the center of the drive bearing.

17. The servo gear pump according to claim 12, wherein the second relief includes a third flycut, a fourth flycut, and a third curved portion, wherein the third flycut is a lateral distance 0.070 inches (0.178 cm) from a center of the drive bearing arranged at an 11 degree angle to the center of the drive bearing, the fourth flycut is a radial distance 0.640 inches (1.63 cm) from the center of the drive bearing, the fourth flycut is arranged at an 11 degree angle to the center of the drive bearing, the third curved portion has a radius of about 0.060 inches (0.152 cm).

18. The servo gear pump according to claim 12, wherein the third relief includes a fifth flycut, a sixth flycut, and a fourth curved portion, wherein the fifth flycut is a lateral distance 0.080 inches (0.203 cm) from a center of the driven bearing, the fifth flycut being arranged at a 20 degree angle to the center of the driven bearing, the sixth flycut is a radial distance 0.640 inches (1.63 cm) from the center of the driven bearing and is arranged at a 28 degree angle to the center of the driven bearing, and the fourth curved portion has a radius of about 0.060 inches (0.152 cm).

19. The servo gear pump according to claim 12, wherein the fourth relief includes a seventh flycut, an eight flycut, a fifth curved portion, and a sixth curved portion, wherein the seventh flycut is a lateral distance 0.120 inches (0.305 cm) from a center of the driven bearing, the seventh flycut being arranged at an 11 degree angle to the center of the driven bearing, the eight flycut is a radial distance 0.640 inches (1.63 cm) from the center of the driven bearing, the eight flycut being arranged at a 11 degree angle to the center of the driven bearing, the fifth curved portion has a radius of about 0.060 inches (0.152 cm) and the sixth curved portion has a radius of about 0.640 inches (1.63 cm).

20. The servo gear pump according to claim 12, wherein the drive bearing and the driven bearing have a depth of about 0.100 inches (0.0254 cm).

* * * * *